United States Patent Office 3,318,850
Patented May 9, 1967

3,318,850
VINYLIDENE FLUORIDE INTERPOLYMERS
Frederic B. Stilmar, Wilmington, Del., assignor to E. I. du Pont de Nemours and Company, Wilmington, Del., a corporation of Delaware
No Drawing. Filed June 10, 1963, Ser. No. 286,470
12 Claims. (Cl. 260—78.5)

This invention relates to vinylidene fluoride copolymers.

Polymers prepared by copolymerizing vinylidene fluoride with other fluorine-containing compounds have been extensively described in the prior art. Some of the earlier patents in this field are referred to in the first column of U.S. Patent 2,479,367, and one of these earlier patents that merits specific mention in connection with the present invention is U.S. Patent 2,468,054 to Thomas A. Ford. The Ford patent discloses the copolymerization of vinylidene fluoride with tetrafluoroethylene or with a mixture of tetrafluoroethylene and another halogenated ethylene to produce tough, thermally stable polymers which are useful in coating and insulating materials. Many of the more recent patents relating to vinylidene fluoride polymerization are concerned with the production of elastomeric vinylidene fluoride polymers. For example, U.S. Patent 3,069,401, issued Dec. 18, 1962, discloses an elastomeric copolymer of hexafluoropropylene, vinylidene fluoride, and aliphatic chain transfer agents. Another recent patent is U.S. 3,080,347, issued Mar. 5, 1963, and it discloses a low-molecular-weight vulcanizable polymer prepared from vinylidene fluoride and perfluoropropene in the presence of an alpha-beta unsaturated carboxylic acid, such as acrylic acid, methacrylic acid, and crotonic acid.

It has been mentioned above in connection with the Ford patent that certain vinylidene fluoride copolymers such as vinylidene fluoride-tetrafluoroethylene polymers, are useful as protective coatings. These copolymers can be dissolved in organic solvents and applied to structural surfaces which are to be subjected to severe exposure conditions. In many instances, these polymeric solutions are combined with pigments and other coating composition vehicles prior to application to the surface to be protected. Since vinylidene fluoride copolymers are especially stable, they provide long-lasting protection to surfaces on which they are applied. On the other hand, however, these copolymers have certain disadvantages. These materials do not adhere well to most substrates without adhesive; thus, a certain amount of extra work and inconvenience is involved in application of the copolymer in conjunction with the adhesive. In addition to this, the adhesive is usually considerably less stable than the vinylidene fluoride copolymers, and as a result the protective coating fails long before the useful properties of the copolymers are exhausted.

The present invention provides novel copolymers of vinylidene fluoride possessing outstanding adhesion and durability properties when used as protective coatings. These copolymers are prepared from known materials which have been previously used in preparation of fluoroethylene polymers. However, the particular combination of copolymerizable monomers of this invention and the proportions in which they are found in the polymer end product have not been heretofore known, and this combination in the specified proportion results in novel polymers with adhesion, solubility, and durability properties not found in prior art products.

The novel polymers of this invention are prepared by copolymerizing at pressure of 100–10,000 p.s.i.g. and temperatures of 60°–140° C. at least 50% by weight of vinylidene fluoride, 2.5 to 49.5% by weight of tetrafluoroethylene, and 0.1 to 10% by weight of a copolymerizable, olefinically unsaturated aliphatic compound. The polymerization is carried out in the presence of a substantially inert solvent and a free radical initiator. If desired, up to 50% by weight of the tetrafluoroethylene may be replaced by a vinyl ester of the formula $CH_2=CHO_2CR$ where R is an alkyl group of 1 to 17 carbon atoms.

The polymer compositions obtained in the copolymerization reaction are film-forming solids dispersed or dissolved in the reaction solvent. When the end product is obtained in dissolved form, the liquid reaction mass may be diluted with ethyl alcohol or other solvent which causes the polymeric product to precipitate, whereupon it can be recovered by conventional means such as decantation or filtration.

The polymer chains of the products of this invention contain at least three different chain units. First, there is the chain unit $-CH_2-CF_2-$ derived from vinylidene fluoride. It has been found upon analysis that the products of this invention have a vinylidene fluoride content of at least 50 to about 97% by weight.

The second chain unit, $-CF_2-CF_2-$, is derived from the tetrafluoroethylene used, and the tetrafluoroethylene content of the end product is about 2.5 to 49.5% by weight. In instances where a portion of the tetrafluoroethylene is replaced by a vinyl ester, the polymers contain a substantially proportionate amount of chain units of the structure

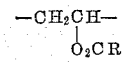

where R is a $C_1$ to $C_{17}$ alkyl group. The vinyl esters are preferably those of saturated, straight chain fatty acids of two to 18 carbon atoms, i.e., acetic to stearic acids.

The third chain unit in the polymers of this invention is derived from the olefinically unsaturated aliphatic compound used as a reactant and the content of these aliphatic compounds in the final polymer is about 0.1 to 10% by weight. The structure of the chain unit derived from the copolymerizable, olefinically unsaturated aliphatic compound will vary, of course, depending upon the particular unsaturated acid, ester, or salt selected as the starting material. Due to the variation in the choice of these materials, it is impossible to set forth a simple structural representation of the chain unit. However, such units may be represented by the empirical formula

where A is hydrogen, $C_1$–$C_{10}$ alkyl, or R'Z; B is hydrogen, $C_1$–$C_2$ alkyl, chlorine, or R'Z; R' is $-C_nH_{2n}$, wherein $n$ is 0–10 and Z is $-CO_2R''$, $-SO_3R''$, or

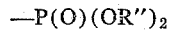

R'' being hydrogen, $C_1$–$C_6$ alkyl, $C_1$–$C_6$ monochloroalkyl, alkali metal, or the ammonium group. These olefinically unsaturated aliphatic compounds should contain no more than 2 acid groups; therefore, A and B cannot simultaneously represent $-R'Z$. This chain unit is derived from compounds of the empirical formula

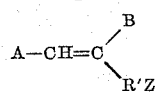

the symbols in this latter formula having the meanings set forth above.

It will be seen from the above empirical formula that the third chain unit in the polymers of this invention is derived from compounds that may be characterized as olefinically unsaturated aliphatic hydrocarbon (or aliphatic halohydrocarbon) compounds containing 1–2 acidic radicals selected from the group consisting of —$CO_2R''$, —$SO_3R''$, and —$P(O)(OR'')_2$ where $R''$ is H, $C_1$–$C_6$ alkyl, $C_1$–$C_6$ monochloroalkyl, alkali metal, or an ammonium group. The compounds include olefinically unsaturated mono- and di-carboxylic acids, sulfonic acids, phosphonic acids; the lower alkyl esters of these acids; and the lower haloalkyl esters and salts of these same acids. Specific illustrations of these compounds include the following aliphatic carboxylic acids: acrylic acid, methacrylic acid, α-chloroacrylic acid, crotonic acid, vinylacetic acid, allylacetic acid, 10-undecylenic acid, oleic acid, maleic acid, fumaric acid, itaconic acid, and their homologs. Sulfonic acids that can be used include ethylenesulfonic acid, 1-propene-1-sulfonic acid, allylsulfonic acid, 17-octadecenesulfonic acid, 2-butene-1,4-disulfonic acid, 2-methylpropene-1,3-disulfonic acid, 2-sulfonylmethylpropene-3-sulfonic acid, and their homologs. β-Styrenesulfonic acid which may be classed as an aryl-substituted aliphatic sulfonic acid has given good results in this invention. In instances where it is desirable to use esters of sulfonic acid, the ethyl ester of ethylenesulfonic acid will produce desirable copolymers. Phosphonic acids that may be used include vinylphosphonic acid, allylphosphonic acid, 17-octadecenephosphonic acid, 2-butene-1,4-diphosphonic acid, 8-octadecene-1,18-diphosphonic acid, 2-phosphonylmethylpropene-3-phosphonic acid, and their homologs. Useful esters of the above acid include the various isomeric methyl, ethyl, propyl, butyl, amyl, and hexyl esters. The tert-butyl esters are particularly preferred, and 2-chloroethyl esters are preferred haloalkyl esters. Because of their hygroscopic nature, the phosphonic acid monomers are preferably used as esters and the sulfonic acid monomers as alkali metal or ammonium salts. Bis(2-chloroethyl) vinylphosphonate and itaconic acid are preferred starting materials.

The crystalline melting points (135°–150° C.) of the polymers of this invention indicate that these polymers are medium-to-high molecular weight materials; that is, they are considered to have molecular weights in excess of 5,000, for instance, 5,000 to 100,000. It has been found that inherent viscosity is a far more useful criterion of the present polymers than molecular weight since their usefulness as coating materials is directly related to their inherent viscosities without reference to molecular weight. The polymers of this invention have inherent viscosities between 0.35 and 2.0 as 0.5% solutions by weight in dimethylformamide at 25° C., and those having inherent viscosities of 0.4 to 1.0 are preferred. Polymers of this invention in this viscosity range have tensile strengths greater than 100 p.s.i. and usually several thousand p.s.i. They are still sufficiently flexible, however, to resist cracking on bending or with expansion and contraction of the substrates to which they may be applied. The inherent viscosity is derived from the equation $$n_1 = \frac{1}{C} \ln \left[ \frac{n}{n_o} \right]$$

wherein $n$ is the measured viscosity of the 0.5% solution in dimethylformamide, $n_o$ is the measured viscosity of pure dimethylformamide, ln is the natural logarithm, and C is the concentration of the polymer in grams/100 ml. of solution. The method of measurement used herein was the capillary or Ostwald method. For further details on viscosity measurements, see Weissberger, "Techniques of Organic Chemistry," vol. I, part I, third ed., pp. 689 et seq.

Preferred compositions according to this invention are copolymers having 65 to 80% by weight of chain units derived from vinylidene fluoride, 15 to 30% by weight of chain units derived from tetrafluoroethylene (or from a mixture of tetrafluoroethylene and vinyl ester in the proportions heretofore specified), 0.3 to 5.0% by weight of chain units derived from the olefinically unsaturated aliphatic compound. These preferred polymers should also have an inherent viscosity of 0.4 to 1 as 0.5% solutions in dimethylformamide at 25° C.

When the polymers are to be used primarily as protective coatings on structural materials, the tetrafluoroethylene content or the mixture of tetrafluoroethylene with the vinyl ester should be not greater than about 34.5% by weight, while a content of 15–30% by weight is preferred. Special-purpose coating materials for electrical apparatus and components such as wire, capacitors, and resistors require superior electrical properties more than strength. For this reason, copolymers containing 40% to 49.5% tetrafluoroethylene are preferred for this purpose since they have better arc resistance, dirt resistance, oil resistance, and insolubility in common solvents. Such polymers, however, may be too soft for other applications. The vinyl esters increase the solubility of the polymer without materially affecting the other properties if used in the range specified. The added vinyl esters also tend to give better room temperature coalescibility in clear coatings. Vinyl esters such as vinyl acetate, vinyl butyrate, and vinyl stearate are commercially available materials.

It has been stated above that the polymers of this invention are prepared by heating under pressure vinylidene fluoride, tetrafluoroethylene, and the olefinically unsaturated aliphatic compounds in the presence of free radical initiators and a substantially inert organic solvent. Many useful solvents or solvent combinations are known. These include the lower molecular weight, straight chain, saturated fatty acids such as acetic acid, tertiary alcohols such as tertiary-butyl alcohol or tertiary-amyl alcohol, saturated, straight chain aliphatic nitriles such as acetonitrile, chlorofluorocarbons and fluorocarbons such as 1,1,2 - trichloro - 1,2,2-trifluoroethane, perfluorodimethylcyclobutane or perfluorodimethylcylohexane and certain inert esters. A most useful ester and a preferred solvent is 2,2,3,3 - tetrafluoropropylacetate. The use of this allows the preparation of higher molecular weight polymers of more uniform composition under otherwise equivalent conditions than other solvents. Solvent combinations such as trichlorotrifluoroethane with acetonitrile or acetic acid, tert-butyl alcohol with acetic acid, acetic acid with monochlorodifluoromethane or tetrafluoropropyl acetate with acetic acid have also been used. The amount of solvent used should be sufficient to disperse or dissolve the polymeric product. Generally, the weight of solvent should at least equal the weight of the reactants.

As a general rule, organic peroxides which are soluble in the reaction solvent are used as the free-radical initiators. At temperatures below 100° C., acyl peroxides such as dilauroyl peroxide or benzoyl peroxide are most useful. However, if the olefinically unsaturated compound is a free carboxylic acid such as acrylic or methacrylic acid, peroxy esters such as tert-butyl perbenzoate or acetate should be used. In cases where the polymerization will not proceed at below 100° C., peroxy esters and higher temperatures, e.g., 100°–120° C. can be used. In reactions which are particularly difficult to initiate, di-tert-alkyl peroxides such as di-tert-butyl peroxide or di-tert-amyl peroxide at 120°–140° C. are recommended. As a general rule, the reaction should be carried out at as low a temperature as possible since this minimizes the tendency of the solvent to enter into the reaction. A second mode of minimizing solvent reaction is by the use of higher pressures which increase the concentration of the more volatile monomers such as vinylidene fluoride and tetrafluoroethylene in the reaction solvent. This increases the probability of chain propagation over chain transfer with the solvent. Higher pressures are particularly useful to keep temperatures to a minimum.

The copolymerization is carried out in a sealed system which is adapted to withstand the pressures used in the reactor. These may range from 100 p.s.i.g. to as high as 10,000 p.s.i.g. Either batch or continuous systems may be used. The materials of construction for the reaction system require no special consideration except that they must be capable of withstanding the temperatures and pressures used. Generally, steel, "Monel," "Inconel," "Hastelloy," or stainless steel are used.

The reactants, solvent, and initiator are added to the pressure vessel in the batch system and heated, usually with agitation, until the reaction stops. Once initiated, many of these polymerizations are exothermic, and care should be taken to maintain temperature control. When the reaction is complete, any unreacted gaseous monomers are removed or recovered. The liquid reaction mass is then diluted with ethyl alcohol or other solvent which causes the polymeric product to precipitate completely. The precipitated product is then washed with alcohol and dried. The reaction solvent may be recovered if desired, but the alcohol should be carefully removed since it would interfere with further polymerizations.

In a continuous process, which is preferred, the solid and liquid monomers being used and the initiator are dissolved in the reaction solvent. The resulting solution is pumped into an agitated pressure vessel which is liquid-full of reaction mixture at the desired reaction temperature. At the same time, gaseous monomers such as vinylidene fluoride and tetrafluoroethylene under pressure are forced into the reaction vessel. The reactants are admitted into the vessel in the same ratio as desired in the final product. The pressure within the vessel is maintained at or above autogenous pressure by a pressure release valve in the exit line which opens when its release pressure is reached. Since reactants are continuously pumped into the vessel, product is continuously discharged from the system through the pressure release valve. The liquid end product is usually diluted with alcohol or other solvent to completely precipitate the copolymer which is then further treated as in the batch process. The continuous process produces a more uniform product than the batch process, probably because of the fact that a continuous operation makes it possible to maintain more uniform concentrations of reactants at all times. In a batch process, the concentrations of reactants vary as they are consumed. In operating the continuous process, it is especially preferred to use 2,2,3,3-tetrafluoropropyl acetate as the reaction solvent. Pressures for this process are preferably above autogenous pressure, and more preferably about 800–900 p.s.i. The preferred reaction temperature in most cases is from 80° to 100° C. Feed rates are adjusted to produce maximum conversion which usually involves average residence times of 1.5 to 3.0 hours under the preferred conditions cited. It is understood of course that the preferred conditions vary somewhat with the combination of monomers used.

The polymers of this invention possess several properties which make them especially useful as coating materials. They are stable compositions with good tear strength, and they possess excellent resistance to deterioration upon outdoor exposure. They are soluble in many organic solvents, thus making it relatively easy to apply them to the surface to be protected. Moreover, most of the polymers are soluble in solvents such as methylethyl ketones which are conventional solvents for coating compositions. The most important aspect, however, regarding the use of these polymers as coating compositions is their ability to adhere to the surface to which they are applied. As previously mentioned, prior art vinylidene fluoride polymers have presented problems with respect to adhesion.

The coatings prepared from the polymer compositions of this invention are useful with a number of substrates including metals, both ferrous and nonferrous, wood, rigid vinyl plastics, polyester bonded fibrous glass materials, cement or concrete, brick, and the like. They are particularly useful on structural metals such as aluminum, including surface-treated aluminum, such as anodized aluminum, zinc, chromium, galvanized iron, iron, steel, brass, copper, tin plate, and magnesium. In preparing coatings with the polymers of this invention, a ketonic solvent solution of the polymer is applied to the surface and the solvent is allowed to evaporate under ordinary conditions. The dry coating may then be given a short heat treatment, say, 150° to 200° C., for one to two minutes. The desirability of the heat treatment varies with both the surface being coated and the polymer being used. When metals such as aluminum, zinc, or chromium are being coated or when the polymer contains chain units derived from an ester, heating is recommended. The coating thickness is variable at will and is adjusted by the control of the concentration of polymer in the solution and the amount of solution applied. Coatings of one mil thickness have been found particularly suitable for most purposes. Ten to twenty-five percent by weight solutions of the polymer in methylethyl ketone have been found particularly useful, but a wide range of other concentrations can be used. Experience has shown that certain polymers give better results with clears on certain substrates than others. The polymers containing the phosphonic acid group give the best results with aluminum and chromium. The best results with steel, steel primed with organic primers such as red lead-linseed oil, epoxy and vinyldioxolane primers, galvanized iron, copper, brass, and most organic polymers, are obtained with pigmented polymers containing itaconic acid. Polymers containing acrylic acid, methacrylic acid, and their esters are also useful in pigmented coatings. Usually from 20 to 60 parts of finely divided pigment per 100 parts of polymer are used. Pigments such as titanium dioxide and copper phthalocyanine work well in the polymer coating. The incorporation of the pigment into a solution of the polymer is done in a conventional manner. For example, ball milling the pigment with the polymer solution is suitable.

For a clearer understanding of the invention, the following specific examples are given. These examples are intended to be merely illustrative of the invention and not in limitation thereof. Unless otherwise specified, all parts are by weight. The analytical data reported in these examples were obtained by the following procedures: The elemental analyses were carried out using standard methods. Free acid groups in the polymers were determined by dissolving a weighed sample of the polymer in a suitable solvent and titrating with standardized potassium hydroxide solution. The copolymers were also analyzed by infrared absorption analysis and by a nuclear magnetic resonance technique. In the nuclear magnetic resonance spectra (NMR) of solutions of the polymers, characteristic peaks appear due to (a) two adjacent —$CF_2$— groups and (b) a —$CF_2$— group adjacent to a —$CH_2$— group. By calibrating using known polymeric material containing vinylidene fluoride and tetrafluoroethylene, these two peaks are used to calculate the ratio $$\frac{Wt.\ CF_2=CH_2}{Wt.\ CF_2=CH_2+CF_2=CH_2} \times 100$$

In the infrared spectra of standard weight solutions of polymers containing chain units derived from esters, the carbonyl group or groups give absorption peaks at 5.6 microns. This absorption pattern at 5.6 microns is compared with the absorption at 3.3 microns where the absorption peaks are due to the C—H bonds. The ratio obtained is directly proportional to the weight percent ester carbonyl group present, the proportionality factor being derived from known standard materials.

Example I

A mixture of 105 parts acetic acid, 80 parts tert-butyl alcohol, 0.2 part di-tert-butyl peroxide, and 7.92 parts (4.3%) bis(2-chloroethyl) vinylphosphonate were placed in a pressure vessel capable of withstanding 10,000 p.s.i. internal pressure. Then 35 parts (19.1%) tetrafluoroethylene and 140 parts (76.6%) vinylidene fluoride were added to the reaction vessel. The sealed vessel was maintained at 135° C. for 8½ hours. During this heating period, the vessel was continuously rocked. The vessel was then cooled to room temperature and the viscous reaction mixture was removed from the reaction vessel and diluted with 400 parts of ethyl alcohol. The precipitated solids were collected and washed with ethyl alcohol, giving 127 parts of polymer. A 0.5% by weight solution of the polymer in dimethylformamide had an inherent viscosity of 0.36 at 25° C.

Analysis of the dry polymer gave the following results:
Phosphorus 0.4%, indicates 3.0% bis(2-chloroethyl) vinylphosphonate.

$$\text{Ratio} \frac{\text{Wt. } CF_2=CH_2}{\text{Wt. } CF_2=CH_2 + CF_2=CF_2} \times 100 = 74.5$$

72.0 weight percent vinylidene fluoride.
25.0 weight percent tetrafluoroethylene.

A 12% dimethylformamide solution of the polymer was applied to clean bright aluminum and baked for two minutes at 180° C., then quenched in water. The coated aluminum was exposed to the elements outdoors. After one year exposure, the aluminum was still bright; there was no indication of corrosion at the edges and no sign of delamination. A similar piece of uncoated bright aluminum was exposed to the same conditons and was dull and weathered looking after only six months.

Another piece of bright aluminum was coated as above and then immersed in boiling 5% aqueous sodium chloride for one month. There was no through film corrosion although there was some corrosion at a cross-cut made in the film.

A one mil coating was applied from a 12% methylethyl ketone solution to a strip of galvanized steel. After exposure to the elements for three months, there was no sign of weathering or rust even where a cross-cut had been made in the coating. A similar piece of steel without the coating had extensively rusted in three months' exposure.

In addition to the test made above, a quick and convenient test has been developed to evaluate the adhesion of the polymers of this invention. This test is referred to as the "Grid-Bend-Boil" test. This test consists of applying a 12% solution of the polymer in methylethyl ketone on a strip of bright aluminum to give a 1 mil coating. The coated aluminum is then heated for 1 minute at 200° C. and quenched in water. The polymer film is then scored with a series of cross-hatch lines, 8 in each direction, approximately ⅛" apart. The test strip is then bent (folded) through the cross-hatched area with the coating at the outside of an approximately 180° bend. The bent test strip is then immersed in boiling water and kept there for at least one hour. After removal from the water, the coated test strip is then examined for signs of failure in the film, as evidenced by a change in appearance in the bright aluminum beneath the film. Adhesion is tested by sticking a piece of pressure-sensitive tape on the cross-hatched area. The tape is stuck to both sides of the bent strip and across the fold. This tape is then pulled away from the coated metal strip. Good adhesion is indicated when none of the coating is removed with the tape. Fair adhesion is indicated when the coating adhesion fails only at the bend while poor adhesion is indicated when the coating is removed in the entire cross-hatched area. In cases where adhesion fails, the entire coating delaminates from the surface of the test piece.

When the product of this example was tested in the Grid-Bend-Boil test, a clear film was obtained and its adhesion was rated as Good; that is, none of the coating was removed when the pressure-sensitive tape was applied and pulled off. There was no indication of a change in the appearance of the aluminum which was underneath the polymer film. As a control, a vinylidene fluoride-tetrafluoroethylene copolymer (approx. 80% by weight vinylidene fluoride, 20% tetrafluoroethylene) prepared according to the previously mentioned U.S. Patent 2,468,054, was tested in the manner of the Grid-Bend-Boil test described above. The polymer film completely pulled away from the metal during this test.

*Example II*

Example I was repeated using 157 parts acetic acid, 117 parts 1,1,2-trichloro-1,2,2-trifluoroethane, 0.5 part dilauroyl peroxide, 6.5 parts (3.3%) bis(2-chloroethyl) vinylphosphonate, 38 parts (19.5%) tetrafluoroethylene, and 150 parts (77.2%) vinylidene fluoride. The polymerization mixture was heated at 69°–75° C. for four hours, then at 75°–86° C. for four hours. After cooling, the polymer was isolated as before, yield 108 parts. A 0.5% solution in dimethylformamide had an inherent viscosity of 0.66 at 25° C.

Analysis of the dry polymer gave the following results:
Phosphorus 0.4%, indicates 3.0% bis(2-chloroethyl) vinylphosphonate.

$$\text{Ratio} \frac{\text{Wt. } CF_2=CH_2}{\text{Wt. } CF_2=CH_2 + CF_2=CF_2} \times 100 = 73$$

70.6 weight percent vinylidene fluoride.
26.4 weight percent tetrafluoroethylene.

A 12% solution of the polymer in methylethyl ketone was applied to an acetone degreased panel of tin plated steel to give a one mil coating. The coating was baked at 200° C. for one minute, then quenched in water. The panel was exposed to the elements for six months and showed no sign of rust or other corrosion. An uncoated panel was covered with rust after a similar period. The Grid-Bend-Boil test on coated aluminum indicated good adhesion with no change in the appearance of the bright aluminum underneath the clear film.

*Example III*

Example I was repeated using 105 parts acetic acid, 98 parts tert-butyl alcohol, 0.5 part dilauroyl peroxide, 1.32 parts (0.6%) bis(2-chloroethyl) vinylphosphonate, 38 parts (20.1%) tetrafluoroethylene and 150 parts (79.3%) vinylidene fluoride. The polymerization mixture was heated for two hours at 68°–95° C. The polymer was isolated as before; yield 112 parts. The inherent viscosity of a 0.5% solution in dimethylformamide was 0.54 at 25° C.

Analysis of the dry polymer gave the following results:
Phosphorus 0.1%, indicates 0.75% bis(2-chloroethyl) vinylphosphonate.

$$\text{Ratio} \frac{\text{Wt. } CF_2=CH_2}{\text{Wt. } CF_2=CH_2 + CF_2=CF_2} \times 100 = 71$$

70.5 weight percent vinylidene fluoride.
28.8 weight percent tetrafluoroethylene.

Films of this polymer were cloudy. However, the Grid-Bend-Boil test on bright aluminum gave good adhesion.

Thirty parts of the polymer were dissolved in 240 parts methylethyl ketone, then fifteen parts of rutile titanium dioxide pigment were added and the mixture was pebble milled overnight. The resulting dispersion was applied to an aluminum panel, giving a white coating which was baked at 200° C. for one minute. An accelerated weather-o-meter test of 1500 hours indicated no substantial change in the appearance of the coating.

*Example IV*

Example I was repeated using 105 parts acetic acid, 194 parts 1,1,2-trichloro-1,2,2-trifluoroethane, 0.5 part dilauroyl peroxide, 1.32 parts (0.5%) bis(2-chloroethyl) vinylphosphonate, 5 parts (2.5%) tetrafluoroethylene, and 195 parts (97.0%) vinylidene fluoride. The polymerization mixture was heated for four hours at 63–68° C. The polymer was isolated as before; yield 71 parts. The inherent viscosity of the polymer as a 0.5% solution in dimethylformamide was 0.44 at 25° C.

Analysis of the dry polymer gave the following results:
Phosphorus 0.1%, indicates 0.75% bis(2-chloroethyl) vinylphosphonate.

$$\text{Ratio} \frac{\text{Wt. } CF_2=CH_2}{\text{Wt. } CF_2=CH_2+CF_2=CF_2} \times 100 = 94$$

93.2 weight percent vinylidene fluoride.
6.0 weight percent tetrafluoroethylene.
Films of this polymer were cloudy. However, the Grid-Bend-Boil test on bright aluminum gave good adhesion.

*Example V*

Example I was repeated using 105 parts acetic acid, 194 parts 1,1,2-trichloro-1,2,2-trifluoroethane, 0.5 part dilauroyl peroxide, 2.64 parts (1.4%) bis(2-chloroethyl) vinylphosphonate, 4.5 parts (2%) vinyl butyrate, 38 parts (20.5%) tetrafluoroethylene, and 140 parts (75.6%) vinylidene fluoride. The polymerization mixture was heated for 3 hours at 60°–70° C. The polymer was isolated as before with a yield of 134 parts. The inherent viscosity of a 0.5% solution in dimethylformamide was 0.70 at 25° C.

Analysis of the dry polymer gave the following results:
Phosphorus 0.2%, indicates 1.5% bis(2-chloroethyl) vinylphosphonate.

$$\text{Infrared ratio} \frac{5.6 \text{ microns}}{3.3 \text{ microns}} = 0.288$$

indicates 0.71% carbonyl = 2.90% vinylbutyrate $$\text{Ratio} \frac{\text{Wt. } CF_2=CH_2}{\text{Wt. } CF_2=CH_2+CF_2=CF_2} \times 100 = 76$$

72.7 weight percent vinylidene fluoride.
22.9 weight percent tetrafluoroethylene.
When the product of this example was tested in the Grid-Bend-Boil test, a clear film was obtained, and its adhesion was rated as Good. There was no indication of a change in the appearance of the aluminum which was underneath the polymer film.

*Example VI*

Example I was repeated using 105 parts acetic acid, 80 parts tert-butyl alcohol, 0.4 part dilauroyl peroxide, 1.0 part (0.5%) acrylic acid, 40 parts (20.0%) tetrafluoroethylene, and 160 parts (80.0%) vinylidene fluoride. The polymerization mixture was heated at 80°–157° C. for one hour. The polymer was isolated as before with a yield of 68 parts. The inherent viscosity as a 0.5% solution in dimethylformamide was 0.58 at 25° C.

Analysis of the dry polymer gave the following results:
Carboxylic acid group titration 0.15 meq. KOH/gram polymer, indicates 1.1% acrylic acid.

$$\text{Ratio} \frac{\text{Wt. } CF_2=CH_2}{\text{Wt. } CF_2=CH_2+CF_2=CF_2} \times 100 = 69.5$$

68.7 weight percent vinylidene fluoride.
30.2 weight percent tetrafluoroethylene.
When the product of this example was tested in the Grid-Bend-Boil test, a clear film was obtained, and its adhesion was rated as good. There was no indication of a change in the appearance of the aluminum which was underneath the polymer film.

*Example VII*

Example I was repeated using 131 parts acetic acid, 80 parts tert-butyl alcohol, 0.3 part tert-butyl perbenzoate, 5.3 parts (2.4%) acrylic acid, 9.3 parts (4.9%) vinyl acetate, 38 parts (18.7%) tetrafluoroethylene, and 150 parts (73.9%) vinylidene fluoride. The polymerization mixture was heated at 100°–110° C. for 2 hours. The polymer was isolated as before; yield 85 parts. The inherent viscosity of a 0.5% solution in dimethylformamide was 0.41 at 25° C.

Analysis of the dry polymer gave the following results:

$$\text{Infrared ratio} \frac{5.6 \text{ microns}}{3.3 \text{ microns}} = 0.745$$

indicates 1.82% ester carbonyl = 5.6% vinyl acetate
Carboxylic acid group titration 0.10 meq. KOH/gram polymer = 0.72% acrylic acid $$\text{Ratio} \frac{\text{Wt. } CF_2=CH_2}{\text{Wt. } CF_2=CH_2+CF_2=CF_2} \times 100 = 73$$

68.3 weight percent vinylidene fluoride.
25.4 weight percent tetrafluoroethylene.
When the product of this example was tested in the Grid-Bend-Boil test, a clear film was obtained, and its adhesion was rated as good. There was no indication of a change in the appearance of the aluminum which was underneath the polymer film.

*Example VIII*

Example I was repeated using 105 parts acetic acid, 194 parts 1,1,2-trichloro-1,2,2-trifluoroethane, 0.5 part dilauroyl peroxide, 4.4 parts (2.8%) tert-butyl acrylate, 35 parts (19.4%) tetrafluoroethylene, and 140 parts (77.8%) vinylidene fluoride. The polymerization mixture was heated at 60°–65° C. for one hour, 65°–75° C. for ten hours, then at 85° C. for one hour. The polymer was isolated as before; yield 136 parts. The inherent viscosity as a 0.5% solution in dimethylformamide was 0.81 at 25° C.

Analysis of the dry polymer gave the following results:

$$\text{Ratio} \frac{\text{Wt. } CF_2=CH_2}{\text{Wt. } CF_2=CH_2+CF_2=CF_2} \times 100 = 77$$

$$\text{Infrared ratio} \frac{5.6 \text{ microns}}{3.3 \text{ microns}} = 0.115$$

indicates 0.282% carbonyl = 1.3% tert-butyl acrylate
76% by weight vinylidene fluoride.
22.7% by weight tetrafluoroethylene.
When the product of this example was tested in the Grid-Bend-Boil test, a clear film was obtained, and its adhesion was rated as Good. There was no indication of a change in the appearance of the aluminum which was underneath the polymer film.

*Example IX*

Example I was repeated using 105 parts acetic acid, 80 parts tert-butyl alcohol, 0.5 part dilauroyl peroxide, 4.6 parts (2.4%) vinyl acetate, 1.8 parts (0.8%) tert-butyl acrylate, 40 parts (19.3%) tetrafluoroethylene, and 160 parts (77.3%) vinylidene fluoride. The polymerization mixture was heated at 60°–70° C. for one hour. The polymer was isolated as before; yield 106 parts. The inherent viscosity of the polymer as a 0.5% solution in dimethylformamide was 0.64 at 25° C. Films of the polymer were clear.

Thirty parts of the polymer were dissolved in 240 parts of methylethyl ketone and 15 parts of rutile titanium dioxide pigment were added. After pebble milling overnight, the mixture was applied to a redwood lumber panel, giving a white coating of good adhesion and weatherability. Application of the polymer solution omitting the pigment to a redwood panel also gave a coating with good adhesion and weatherability. The unpigmented coating is 98% transparent to solar radiation; thus, if the substrate is sensitive to sunlight, pigmented coatings are preferred.

*Example X*

Example I was repeated using 105 parts acetic acid, 80 parts tert-butyl alcohol, 0.3 part tert-butyl perbenzoate, 2.0 parts (1.0%) methacrylic acid, 27.9 parts (14.5%) vinyl acetate, 35 parts (16.9%) tetrafluoroethylene, and 140 parts (67.7%) vinylidene fluoride. The polymerization mixture was heated at 108°–122° C. for two hours. The polymer was isolated as before; yield 161 parts. The inherent viscosity of the polymer as a 0.5% solution in dimethylformamide was 0.49 at 25° C.

Analysis of the dry polymer gave the following results:

$$\text{Infrared ratio } \frac{5.6 \text{ microns}}{3.3 \text{ microns}} = 1.54$$

indicates 3.8% ester carbonyl=11.7% vinyl acetate

Carboxylic acid group titration 0.06 meg. KOH/gram polymer=0.52% methacrylic acid $$\text{Ratio } \frac{\text{Wt. } CF_2=CH_2}{\text{Wt. } CF_2=CH_2+CF_2=CF_2} \times 100 = 74.5$$

65.3 weight percent vinylidene fluoride.
22.5 weight percent tetrafluoroethylene.

A 12% solution of the polymer in methylethyl ketone containing 12% zinc dust was applied to a phosphate primed steel panel. After eight months' exposure to the elements, the coated panel showed no signs of rust even where the coating had been cut.

When the product of this example was tested in the Grid-Bend-Boil test, a clear film was obtained, and its adhesion was rated as Good. There was no indication of a change in the appearance of the aluminum which was underneath the polymer film.

*Example XI*

Example I was repeated using 105 parts acetic acid, 80 parts tert-butyl alcohol, 0.2 part di-tert-butyl peroxide, 2.0 parts (1.0%) methacrylic acid, 8.52 parts (4.3%) vinyl stearate, 38 parts (19.2%) tetrafluoroethylene, and 150 parts (75.6%) vinylidene fluoride. The polymerization mixture was heated at 120°–135° C. for ten hours. The polymer was isolated as before; yield 157 parts. The inherent viscosity of the polymer as a 0.5% solution in dimethylformamide was 0.46 at 25° C.

Analysis of the dry polymer gave the following results:

$$\text{Infrared ratio } \frac{5.6 \text{ microns}}{3.3 \text{ microns}} = 0.30$$

indicates 0.74% ester carbonyl=8.2% vinyl stearate

Carboxylic acid group titration 0.105 meg. KOH/gram polymer=0.9% methacrylic acid $$\text{Ratio } \frac{\text{Wt. } CF_2=CH_2}{\text{Wt. } CF_2=CH_2+CF_2=CF_2} \times 100 = 75.0$$

68.2 weight percent vinylidene fluoride.
22.7 weight percent tetrafluoroethylene.

Films of this polymer were cloudy. However, the Grid-Bend-Boil test on bright aluminum gave good adhesion.

*Example XII*

Example I was repeated using 194 parts 1,1,2-trichloro-1,2,2-trifluoroethane, 105 parts acetic acid, 0.3 part tert-butyl perbenzoate, 1.0 parts (0.6%) methacrylic acid, 35 parts (19.9%) tetrafluoroethylene, and 140 parts (79.6%) vinylidene fluoride. The polymerization mixture was heated at 110–128° C. for 4 hours. The polymer was isolated as before; yield 52 parts. The polymer had a crystalline melting point of 141° C. The inherent viscosity of the polymer as a 0.5% solution in dimethylformamide was 0.71 at 25° C.

Analysis of the dry polymer gave the following results:

Carboxylic acid group titration 0.39 meg. KOH/gram polymer=0.34% methacrylic acid $$\text{Ratio } \frac{\text{Wt. } CF_2=CH_2}{\text{Wt. } CF_2=CH_2+CF_2=CF_2} \times 100 = 76$$

75.6 weight percent vinylidene fluoride.
24.0 weight percent tetrafluoroethylene.

When the product of this example was tested in the Grid-Bend-Boil test, a clear film was obtained, and its adhesion was rated as Good. There was no indication of a change in the appearance of the aluminum which was underneath the polymer film.

*Example XIII*

Example I was repeated using 105 parts acetic acid, 155 parts 1,1,2-trichloro-1,2,2-trifluoroethane, 0.4 part tert-butyl perbenzoate, 5.0 parts (2.4%) methyl methacrylate, 40 parts (19.5%) tetrafluoroethylene, and 160 parts (78.1%) vinylidene fluoride. The polymerization mixture was heated at 100°–105° C. for one hour, then at 105°–120° C. for ten hours. The polymer was isolated as before; yield 110 parts. The inherent viscosity of the polymer as a 0.5% solution in dimethylformamide was 0.55 at 25° C.

Analysis of the dry polymer gave the following results:

$$\text{Ratio } \frac{\text{Wt. } CF_2=CH_2}{\text{Wt. } CF_2=CH_2+CF_2=CF_2} \times 100 = 73$$

$$\text{Infrared ratio } \frac{5.6 \text{ microns}}{3.3 \text{ microns}} = 0.160$$

indicates 0.392% carbonyl=1.1% methyl methacrylate
72.0 weight percent vinylidene fluoride.
26.9 weight percent tetrafluoroethylene.

Films of this polymer were cloudy. However, the Grid-Bend-Boil test on bright aluminum gave good adhesion.

*Example XIV*

Example I was repeated using 52.5 parts acetic acid, 233 parts 1,1,2-trichloro-1,2,2-trifluoroethane, 0.2 part di-tert-butyl peroxide, 3.5 parts (2.0%) tert-butyl methacrylate, 35 parts (19.6%) tetrafluoroethylene, and 140 parts (78.4%) vinylidene fluoride. The polymerization mixture was heated at 120°–134° C. for about 9½ hours. The polymer was isolated as before; yield 139 parts. The inherent viscosity of the polymer as a 0.5% solution in dimethylformamide was 0.58 at 25° C.

Analysis of the polymer gave the following results:

$$\text{Ratio } \frac{\text{Wt. } CF_2=CH_2}{\text{Wt. } CF_2=CH_2+CF_2=CF_2} \times 100 = 73$$

$$\text{Infrared ratio } \frac{5.6 \text{ microns}}{3.3 \text{ microns}} = 0.132$$

indicates 0.32% ester carbonyl=1.5% tert-butyl methacrylate
71.8 weight percent vinylidene fluoride.
26.7 weight percent tetrafluoroethylene.

A one mil coating of the polymer was applied to a magnesium strip from methylethyl ketone solution and baked at 210° C. for one minute, then quenched in water. Exposure of the coated strip to the elements for ten months gave no indication of corrosion or degradation. A similar uncoated magnesium strip was dull and showed evidence of corrosion after ten months under the same conditions.

When the product of this example was tested in the Grid-Bend-Boil test, a clear film was obtained, and its adhesion was rated as Good. There was no indication of a change in the appearance of the aluminum which was underneath the polymer film.

*Example XV*

Example I was repeated using 105 parts acetic acid, 194 parts 1,1,2-trichloro-1,2,2-trifluoroethane, 0.4 part dilauroyl peroxide, 0.9 part (0.5%) tert-butyl methacrylate, 35 parts (19.9%) tetrafluoroethylene, and 140 parts (79.6%) vinylidene fluoride. The polymerization mixture was heated at 80°–101° C. for ten hours. The polymer was isolated as before; yield 105 parts. The polymer had a crystalline melting point of 143° C. The inherent viscosity of the polymer as a 0.5% solution in dimethylformamide was 0.70 at 25° C.

Partial analysis of the polymer gave the following results:

$$\text{Ratio } \frac{\text{Wt. } CF_2=CH_2}{\text{Wt. } CF_2=CH_2+CF_2=CF_2} \times 100 = 72$$

The ester carbonyl bond at 5.6 microns is present in the infrared spectrum.

A one mil coating of the polymer was applied from methylethyl ketone solution to galvanized steel having a phosphate primer. The coating was baked for one minute at 200° C., then quenched in water. After exposure to the elements for nine months, essentially no change had occurred. A sample of the same pretreated galvanized steel showed signs of weathering after nine months' exposure under the same conditions.

A similar coating was applied to unprimed galvanized steel, without baking. Three months' exposure to the elements resulted in no indications of corrosion or weathering.

When the product of this example was tested in the Grid-Bend-Boil test, a clear film was obtained, and its adhesion was rated as Good. There was no indication of a change in the appearance of the aluminum which was underneath the polymer film.

*Example XVI*

Example I was repeated using 105 parts acetic acid, 80 parts tert-butyl alcohol, 0.4 part dilauroyl peroxide, 0.9 part (0.5%) tert-butyl methacrylate, 4.6 parts (2.5%) vinyl acetate, 40 parts (21.5%) tetrafluoroethylene, and 140 parts (75.5%) vinylidene fluoride. The polymerization mixture was heated at 78°–95° C. for 7+ hours. The polymer was isolated as before; yield 104 parts. The film was clear with good tear strength. The Grid-Bend-Boil test applied to coated bright aluminum indicated good adhesion. The inherent viscosity of the polymer as a 0.5% solution in dimethylformamide was 0.64 at 25° C.

Partial analysis of the dry polymer gave the following results:

$$\text{Infrared ratio } \frac{5.6 \text{ microns}}{3.3 \text{ microns}} = 0.535$$

indicates 1.32% ester carbonyl by weight $$\text{Ratio } \frac{\text{Wt. } CF_2=CH_2}{\text{Wt. } CF_2=CH_2 + CF_2=CF_2} \times 100 = 69.0$$

A phosphate primed steel strip was given a 4 to 5 mil coating of poly{bis[2 - (2,3-dihydro-4H-pyranol)methyl]itaconate}

Then a one mil coating of the polymer of this example was applied as a methylethyl ketone solution without baking. The resulting steel sample was exposed to the elements for three months and gave no indication of rusting.

A carbon steel panel (automobile grade) was coated with a commercial steel primer containing metallic zinc. Then the polymer of this example was applied as a methylethyl ketone solution, followed by baking at 200° C. for two minutes. After six months' exposure to the elements, there was no sign of underfilm corrosion or weathering, even at a cross-hatch cut in the underfilm to the base metal.

*Example XVII*

Example I was repeated using 131 parts of acetic acid, 80 parts tert-butyl alcohol, 0.5 part dilauroyl peroxide, 2.0 parts (1.1%) diethyl 2-methallyloxyethylphosphonate

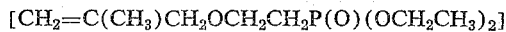

35 parts (19.8%) tetrafluoroethylene, and 140 parts (79.1%) vinylidene fluoride. The polymerization mixture was heated at 65°–75° C. for one hour, then 90° C. for four hours. The polymer was isolated as before; yield 67 parts. The inherent viscosity of the polymer as a 0.5% solution in dimethylformamide was 0.51 at 25° C.

Analysis of the dry polymer gave the following results:
Phosphorus 0.2%, indicates 2.1% diethyl-2-methallyloxyethylphosphonate $$\text{Ratio } \frac{\text{Wt. } CF_2=CH_2}{\text{Wt. } CF_2=CH_2 + CF_2=CF_2} \times 100 = 57.5$$

56.2 weight percent vinylidene fluoride.
41.7 weight percent tetrafluoroethylene.
Films of this polymer were cloudy. The Grid-Bend-Boil test on bright aluminum gave fair adhesion.

*Example XVIII*

Example I was repeated using 59 parts acetonitrile, 233 parts 1,1,2-trichloro-1,2,2-trifluoroethane, 0.3 part tert-butyl perbenzoate, 2.0 parts (1.1%) vinylacetic acid, 35 parts (19.9%) tetrafluoroethylene, and 140 parts (79.1%) vinylidene fluoride. The polymerization mixture was heated at 110–125° C. for 11 hours. The polymer was isolated as before; yield 61 parts. The inherent viscosity of the polymer was a 0.5% solution in dimethylformamide solution was 0.42 at 25° C.

Analysis of the dry polymer gave the following results:
Carboxylic acid group titration 0.05 meg. KOH/gram polymer, indicates 0.44% vinylacetic acid $$\text{Ratio } \frac{\text{Wt. } CF_2=CH_2}{\text{Wt. } CF_2=CH_2 + CF_2=CF_2} \times 100 = 71$$

70.7 weight percent vinylidene fluoride.
28.8 weight percent tetrafluoroethylene.

When the product of this example was tested in the Grid-Bend-Boil test, a clear film was obtained, and its adhesion was rated as Good. There was no indication of a change in the appearance of the aluminum which was underneath the polymer film.

*Example XIX*

Example I was repeated using 131 parts acetic acid, 80 parts tert-butyl alcohol, 0.5 part dilauroyl peroxide, 1.0 part (0.5%) dimethyl itaconate, 38 parts (20.1%) tetrafluoroethylene, and 150 parts (79.4%) vinylidene fluoride. The polymerization mixture was heated at 80°–90° C. for 2 hours. The polymer was isolated as before; yield 65.3 parts. The inherent viscosity of the polymer as a 0.5% solution in dimethylformamide was 0.63 at 25° C.

Analysis of the dry polymer gave the following results:

$$\text{Infrared ratio } \frac{5.6 \text{ microns}}{3.3 \text{ microns}} = 0.138$$

indicates 0.34% ester carbonyl=0.96% dimethyl itaconate $$\text{Ratio } \frac{\text{Wt. } CF_2=CH_2}{\text{Wt. } CF_2=CH_2 + CF_2=CF_2} \times 100 = 67$$

66.3 weight percent vinylidene fluoride.
32.7 weight percent tetrafluoroethylene.

When the product of this example was tested in the Grid-Bend-Boil test, a clear film was obtained, and its adhesion was rated as Good. There was no indication of a change in the appearance of the aluminum which was underneath the polymer film.

*Example XX*

Example I was repeated using 131 parts acetic acid, 80 parts tert-butyl alcohol, 0.5 part dilauroyl peroxide, 2.0 parts (1.0%) sodium vinylsulfonate, 35 parts (17.7%) tetrafluoroethylene, and 160 parts (81.3%) vinylidene fluoride. The polymerization mixture was heated at 60°–65° C. for one hour, then at 65°–75° C. for 12 hours. The polymer was isolated as before; yield 83 parts. The inherent viscosity of the polymer as a 0.5% solution was 0.49 in dimethylformamide at 25° C.

Analysis of the dry polymer gave the following results:
Sulfur 0.31%, indicates 1.2% sodium vinylsulfonate $$\text{Ratio } \frac{\text{Wt. } CF_2=CH_2}{\text{Wt. } CF_2=CH_2 + CF_2=CF_2} \times 100 = 72$$

71.1 weight percent vinylidene fluoride.
27.7 weight percent tetrafluoroethylene.

Films of this polymer were cloudy. However, the Grid-Bend-Boil test on bright aluminum gave good adhesion.

Example XXI

Example I was repeated using 158 parts acetic acid, 116 parts 1,1,2-trichloro-1,2,2-trifluoroethane, 0.3 part di-tert-butyl peroxide, 1.0 part (0.5%) vinylaceonitrile, 38 parts (20.1%) tetrafluoroethylene, and 150 parts (79.4%) vinylidene fluoride. The polymerization mixture was heated at 115° C. for one hour, then at 140° C. for eight hours. The polymer was isolated as before; yield 116 parts. The inherent viscosity of the polymer as a 0.5% solution in dimethylformamide was 0.37 at 25° C.

Partial analysis (nuclear magnetic resonance spectra) of the dry polymer gave the following results:

$$\text{Ratio} \frac{\text{Wt. } CF_2=CH_2}{\text{Wt. } CF_2=CH_2+CF_2=CF_2} \times 100 = 72$$

Films of this polymer were cloudy. However, the Grid-Bend-Boil test on bright aluminum gave good adhesion.

Example XXII

Example I was repeated using 158 parts acetic acid, 155 parts 1,1,2-trichloro-1,2,2-trifluoroethane, 0.5 part dilauroyl peroxide, 3.0 parts (1.6%) dimethyl allylphosphonate, 38 parts (19.9%) tetrafluoroethylene, and 150 parts (78.5%) vinylidene fluoride. The polymerization mixture was heated at 65°–85° C. for about 10½ hours. The polymer was isolated as before; yield 140 parts. The inherent viscosity of the polymer as a 0.5% solution in dimethylformamide was 0.55 at 25° C.

Analysis of the dry polymer gave the following results:

Phosphorus 0.5%, indicates 2.4% dimethyl allylphosphonate $$\text{Ratio} \frac{\text{Wt. } CF_2=CH_2}{\text{Wt. } CF_2=CH_2+CF_2=CF_2} \times 100 = 73$$

71.2 weight percent vinylidene fluoride.
26.4 weight percent tetrafluoroethylene.

When the product of this example was tested in the Grid-Bend-Boil test, a clear film was obtained, and its adhesion was rated as Good. There was no indication of a change in the appearance of the aluminum which was underneath the polymer film.

Example XXIII

Example I was repeated using 236 parts acetic acid, 9 parts (4.8%) vinyl butyrate, 2 parts (1.1%) itaconic acid, 0.3 part tert-butyl perbenzoate, 35 parts (18.8%) tetrafluoroethylene, and 140 parts (75.3%) vinylidene fluoride. The polymerization mixture was heated at 108–125° C. for about 7½ hours. The polymer was isolated as before; yield 124 parts. The inherent viscosity of the polymer as a 0.5% solution in dimethylformamide was 0.45 at 25° C.

Analysis of the dry polymer gave the following results:

$$\text{Infrared ratio} \frac{5.6 \text{ microns}}{3.3 \text{ microns}} = 0.565$$

indicates 1.41% estercarbonyl=5.74% vinyl butyrate

Carboxylic acid group titration 0.07 meg. KOH/gram polymer=0.46% itaconic acid $$\text{Ratio} \frac{\text{Wt. } CF_2=CH_2}{\text{Wt. } CF_2=CH_2+CF_2=CF_2} \times 100 = 76$$

70.5 weight percent vinylidene fluoride.
22.3 weight percent tetrafluoroethylene.

A coating of the polymer was applied to polyethylene terephthalate sheet from methylethyl ketone solution and baked at 200° C. for one minute. The resulting clear coating adhered well to the polyester film, even after soaking in water for one hour.

When the product of this Example was tested in the Grid-Bend-Boil test, a clear film was obtained, and its adhesion was rated as Good. There was no indication of a change in the appearance of the aluminum which was underneath the polymer film.

A coating of the polymer was applied from methylethyl ketone solution to steel primed with polyvinyl dioxolane. It also gave good adhesion results in the Grid-Bend-Boil test.

Example XXIV

Example XXIII was repeated using 5 parts (2.4%) itaconic acid, 8 parts (3.8%) vinyl butyrate, 40 parts (18.8%) tetrafluoroethylene, and 160 parts (75.1%) vinylidene fluoride and the same amounts of initiator and solvent. After heating and isolating as in Example XXIII, the polymer had an inherent viscosity of 0.50 as a 0.5% solution in dimethylformamide at 25° C. One hundred parts of the polymer were combined with 50 parts rutile titanium dioxide pigment in 830 parts of methylethyl ketone. Cement was coated with this mixture, giving a coating with good adhesion and weatherability.

The same pigmented coating solution was applied to a steel panel primed with polyvinyl dioxolane. The coating was found to be much more weather resistant and dirt resistant than standard alkyd type coating materials for primed steel.

The same pigmented coating solution was applied to rigid vinyl resin sheet designated for outdoor service. The adhesion, weatherability, and resistance to damage by sunlight were excellent. The uncoated vinyl resin sheet has only moderate resistance to sunlight.

Example XXV

The reaction apparatus used in this and the following two examples consisted of a Hastelloy B agitated autoclave of 1500 parts water capacity, a gas feed system and compressor, a liquid feed system and pump, and a pressure release valve for regulating autoclave exit pressure. A stock solution consisting of 0.43 part dilauroyl peroxide, 1.83 parts bis(2-chloroethyl) vinylphosphonate and 537.7 parts of 2,2,3,3-tetrafluoropropyl acetate was pumped at 850 p.s.i.g. and a rate of 540 parts per hour into the autoclave which was maintained at 800 p.s.i.g. and 90° C. Simultaneously, 240 parts of vinylidene fluoride and 60 parts of tetrafluoroethylene per hour were compressed as a mixture to 825–830 p.s.i.g. and fed into the autoclave.

The product was discharged continuously from the autoclave as an approximately 20%-by-weight solution of polymer in tetrafluoropropyl acetate at 70° C. The pressure release valve was regulated so that the discharge rate was substantially equal to the input rate. Solvent was injected into the discharge line downstream from the valve to insure removal of the product from the line since the polymer is not completely soluble at temperatures below 50° C. The yield of polymer was 160–180 parts per hour (53 to 60% conversion).

The product stream from the autoclave as diluted above was cooled to below 25°–30° C. and slurried with carbon tetrachloride. The slurry was cooled to below 20° C. and the solids collected by filtration. The filter cake was reslurried with carbon tetrachloride, recollected, and dried to constant weight at 55°–60° C. Analysis of the dry polymer by nuclear magnetic resonance spectroscopy indicated 83 mol percent vinylidene fluoride which corresponds to 79 weight percent vinylidene fluoride. Chemical analysis indicated 1.4 weight percent bis(2-chloroethyl) vinylphosphonate had entered the polymer. Tetrafluoroethylene content was 19.6%. The inherent viscosity as a 0.5% by weight solution in dimethylformamide was 0.44.

When the product of this example was tested in the Grid-Bend-Boil test, a clear film was obtained, and its adhesion was rated as Good. There was no indication of a change in the appearance of the aluminum which was underneath the polymer film.

Example XXVI

The reaction of Example XXV was repeated using a reaction temperature of 95° C., a reaction pressure of 800 p.s.i.g., a vinylidene fluoride feed rate of 240 parts/hr., a tetrafluoroethylene feed rate of 60 parts/hr., a solution feed rate of 420 parts/hr., and a solution consisting of 3.5 parts dilauroyl peroxide, 20 parts bis(2-chloroethyl) vinyl phosphonate and 1000 parts of 2,2,3,3-tetrafluoropropyl acetate. The product polymer, which was isolated as in Example XXV, contained 60.0% fluorine, 0.2% phosphorus, and had an inherent viscosity of 0.46 as a 0.5% solution in dimethylformamide.

Example XXVII

Using the apparatus and procedure of Example XXV, a stock solution consisting of 6000 parts of 2,2,3,3-tetrafluoropropyl acetate, 6 parts dilauroyl peroxide, and 30 parts of tert-butyl acrylate was pumped at a rate of 450 parts per hour into the autoclave maintained at 800 p.s.i.g. and 100° C. Simultaneously, 240 parts of vinylidene fluoride and 60 parts of tetrafluoroethylene per hour were compressed to 800 p.s.i.g. as a mixture and admitted into the autoclave. After about one hour reaction time, the reaction temperature was lowered to 88° C. Feed rates: tert-butyl acrylate 2.24 parts/hr., dilauroyl peroxide 0.45 part per hr. and tetrafluoropropyl acetate 447.3 parts/hr.

The product was isolated as in Example XXV except that methanol was used in place of carbon tetrachloride to slurry the polymer.. The polymer contained 62.5% fluorine, had an inherent viscosity of 0.51 as a 0.5% solution in dimethylformamide, and contained 1.5% by weight tert-butyl acrylate. Both clear and titanium dioxide pigmented films were applied to aluminum. Both gave good results in the Grid-Bend-Boil test.

Example XXVIII

Example I was repeated using 250 parts acetic acid, 1.3 parts dilauroyl peroxide, 26 parts (12.9%) bis(2-chloroethyl) vinylphosphonate, 35 parts (17.4%) tetrafluoroethylene and 140 parts (69.7%) vinylidene fluoride. The polymerization mixture was heated at 67°–91° C. for about 8 hours. After cooling, the polymer was isolated as before, yield 127 parts. When the product of this example was tested in the Grid-Bend-Boil test, a clear film was obtained, and its adhesion was rated as Good. There was no indication of a change in the appearance of the aluminum which was underneath the polymer film.

Analysis of the dry polymer indicated 1.2% phosphorus which is equivalent to 8.9% bis(2-chloroethyl) vinylphosphonate in the polymer.

Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are defined as follows:

1. Copolymers comprising
 (A) 50 to 97 weight percent of chain units derived from vinylidene fluoride,
 (B) 2.5 to 49.5 weight percent of chain units derived from tetrafluoroethylene, and
 (C) 0.1 to 10 weight percent of chain units derived from an olefinically unsaturated aliphatic compound of the formula

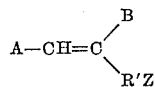

wherein A is a member selected from the group consisting of hydrogen, $C_1$ to $C_{10}$ alkyl, and R'Z, B is a member selected from the group consisting of hydrogen, $C_1$ to $C_2$ alkyl, chlorine, and R'Z, R' is $-C_nH_{2n}$, wherein $n$ is zero to ten, Z is a member selected from the group consisting of $-CO_2R''$ and $-P(O)(OR'')_2$, and R'' is a member selected from the group consisting of hydrogen, $C_1$ to $C_6$ alkyl, $C_1$ to $C_6$ monochloroalkyl, an alkali metal, and an ammonium group; with the proviso that when A is R'Z, B is selected from the group consisting of hydrogen, $C_1$ to $C_2$ alkyl and chlorine;

said copolymers having an inherent viscosity of 0.35 to 2 as 0.5% solutions by weight in dimethylformamide at 25° C.

2. The copolymers of claim 1 in which the chain units derived from tetrafluoroethylene are replaced in an amount up to 50% by weight of the tetrafluoroethylene content with units derived from a vinyl ester of the formula $CH_2=CHO_2CR$ where R is an alkyl group of 1–17 carbon atoms.

3. Copolymers comprising
 (A) 65 to 80 weight percent of chain units derived from vinylidene fluoride,
 (B) 15 to 30 weight percent of chain units derived from tetrafluoroethylene,
 (C) 0.3 to 5.0 weight percent of chain units derived from an olefinically unsaturated aliphatic compound of the formula

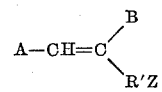

wherein A is a member selected from the group consisting of hydrogen, $C_1$ to $C_{10}$ alkyl, and R'Z, B is a member selected from the group consisting of hydrogen, $C_1$ to $C_2$ alkyl, chlorine, and R'Z, R' is $-C_nH_{2n}$, wherein $n$ is zero to ten, Z is a member selected from the group consisting of $-CO_2R''$ and $-P(O)(OR'')_2$, and R'' is a member selected from the group consisting of hydrogen, $C_1$ to $C_6$ alkyl, $C_1$ to $C_6$ monochloroalkyl, an alkali metal and an ammonium group; with the proviso that when A is R'Z, B is selected from the group consisting of hydrogen, $C_1$ to $C_2$ alkyl and chlorine;

said copolymers having an inherent viscosity of 0.4 to 1 as 0.5% solutions by weight in dimethylformamide at 25° C.

4. The copolymers of claim 3 in which the chain units derived from tetrafluoroethylene are replaced in an amount up to 50% by weight of the tetrafluoroethylene content with units derived from a vinyl ester of the formula $CH_2=CHO_2CR$ where R is an alkyl group of 1–17 carbon atoms.

5. Copolymers comprising 65 to 80 weight percent of chain units derived from vinylidene fluoride, 15 to 30 weight percent of chain units derived from tetrafluoroethylene, 0.3 to 5.0 weight percent of chain units derived from bis(2-chloroethyl)vinylphosphonate, said copolymers having an inherent viscosity of 0.4 to 1 as 0.5% solutions by weight in dimethylformamide at 25° C.

6. Copolymers comprising 65 to 80 weight percent of chain units derived from vinylidene fluoride, 15 to 30 weight percent of chain units derived from tetrafluoroethylene, 0.3 to 5.0 weight percent of chain units derived from itaconic acid, said copolymers having an inherent viscosity of 0.4 to 1 as 0.5% solutions by weight in dimethylformamide at 25° C.

7. An article of manufacture comprising a solid structural surface having thereon an adherent flexible film of a copolymer of claim 1.

8. The article of claim 7 in which the copolymer film is pigmented.

9. An article of manufacture comprising a solid structural surface having thereon an adherent flexible film of a copolymer comprising 65 to 80 weight percent of chain units derived from vinylidene fluoride, 15 to 30 weight percent of chain units derived from tetrafluoroethylene, and 0.3 to 5.0 weight percent of chain units derived from bis(2-chloroethyl)vinylphosphonate.

10. An article of manufacture comprising a solid structural surface having thereon an adherent flexible film of a copolymer comprising 65 to 80 weight percent of chain units derived from vinylidene fluoride, 15 to 30 weight percent of chain units derived from tetrafluoroethylene, and 0.3 to 5.0 weight percent of chain units derived from itaconic acid.

11. A process for preparing a copolymer of vinylidene fluoride, tetrafluoroethylene, and an olefinically unsaturated aliphatic compound comprising heating under pressure at temperatures of about 60° C. to 140° C. at least 50% by weight of vinylidene fluoride, 2.5% to 49.5% by weight tetrafluoroethylene, and 0.1% to 10% by weight of a copolymerizable, olefinically unsaturated aliphatic compound of the formula

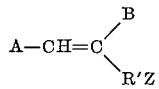

wherein A is a member selected from the group consisting of hydrogen, $C_1$ to $C_{10}$ alkyl, and R'Z, B is a member selected from the group consisting of hydrogen, $C_1$ to $C_2$ alkyl, chlorine, and R'Z, R' is $-C_nH_{2n}$, wherein $n$ is zero to ten, Z is a member selected from the group consisting of $-CO_2R''$ and $-P(O)(OR'')_2$, and R'' is a member selected from the group consisting of hydrogen, $C_1$ to $C_6$ alkyl, $C_1$ to $C_6$ monochloroalkyl, an alkali metal, and an ammonium group; with the proviso that when A is R'Z, B is selected from the group consisting of hydrogen, $C_1$ to $C_2$ alkyl and chlorine; said heating being carried out in the presence of a substantially inert solvent and a free radical initiator.

12. The process of claim 11 in which up to 50% by weight of the tetrafluoroethylene used is replaced with a vinyl ester of the formula $CH_2=CHO_2CR$ where R is an alkyl group of 1–17 carbon atoms.

References Cited by the Examiner
UNITED STATES PATENTS

| | | | |
|---|---|---|---|
| 2,968,649 | 1/1961 | Pailthorp et al. | 260—80.5 |
| 3,194,796 | 7/1965 | Squire | 260—80.5 |
| 3,198,770 | 8/1965 | Watkins | 260—80.5 |

JOSEPH L. SCHOFER, *Primary Examiner.*

W. HOOVER, *Assistant Examiner.*